United States Patent [19]

Cobbs, Jr. et al.

[11] 4,259,402

[45] * Mar. 31, 1981

[54] BONDING WITH FOAMED HOT MELT ADHESIVES

[75] Inventors: Walter H. Cobbs, Jr., Amherst, Ohio; Robert G. Shong, Houston, Tex.

[73] Assignee: Nordson Corporation, Amherst, Ohio

[*] Notice: The portion of the term of this patent subsequent to May 29, 1996, has been disclaimed.

[21] Appl. No.: 6,464

[22] Filed: Jan. 25, 1979

Related U.S. Application Data

[63] Continuation-in-part of Ser. No. 791,338, Apr. 27, 1977, Pat. No. 4,156,754, and Ser. No. 924,990, Jul. 17, 1978.

[51] Int. Cl.³ .............................................. B32B 5/18
[52] U.S. Cl. .................................... 428/310; 156/78; 252/351; 264/45.3; 264/46.5; 264/50; 428/322; 521/908; 521/911
[58] Field of Search .............. 156/78, 309; 428/310, 428/322; 264/45.3, 50, 46.5; 521/82, 911, 908; 252/351

[56] References Cited

U.S. PATENT DOCUMENTS

| | | | |
|---|---|---|---|
| 2,323,831 | 7/1943 | Menger et al. | 156/328 |
| 2,860,377 | 11/1958 | Bernhardt et al. | 264/50 |
| 3,140,266 | 7/1964 | Peticolas | 521/98 |
| 3,151,427 | 10/1964 | Meissner et al. | 156/79 |
| 3,251,092 | 5/1966 | Printz | 264/50 |
| 3,270,032 | 8/1966 | Erner | 521/115 |
| 3,554,932 | 1/1971 | Overcashier | 521/908 |
| 3,681,253 | 8/1972 | Arthur et al. | 252/351 |
| 3,790,510 | 2/1974 | Flannigan | 252/351 |
| 3,823,104 | 7/1974 | Bondy et al. | 260/29.4 UA |
| 4,156,754 | 5/1979 | Cobbs et al. | 156/309 |

*Primary Examiner*—John J. Gallagher
*Attorney, Agent, or Firm*—Wood, Herron & Evans

[57] ABSTRACT

Foamed hot melt adhesives are made and employed by methods which offer significant advantages and economies. The method employs surfactant stabilizers in making hot melt adhesive foams which are very useful in bonding substrates with efficiency and superior bond strengths. Continuous and reliable foaming operations are achieved with a uniform quality and output of foamed materials. Hot melt adhesives are also capable of being foamed with relatively simple mechanical apparatus and under conditions which provide considerable savings of energy. The number of hot melts which can be foamed employing the present technique in a controlled manner is unlimited. The method of stabilization is conducted at low or ambient pressures and resulting stabilized hot melt adhesive gas dispersions may then be pumped with pressurization and dispensed with immediate foaming.

35 Claims, 9 Drawing Figures

BONDING WITH FOAMED HOT MELT ADHESIVES

RELATED APPLICATIONS

This application is a continuation-in-part of applications Ser. No. 791,338, filed Apr. 27, 1977, now U.S. Pat. No. 4,156,754 and application Ser. No. 924,990, filed July 17, 1978, all in the names of Walter H. Cobbs, Jr. and Robert G. Shong.

BACKGROUND OF THE INVENTION

Techniques are disclosed for making hot melt thermoplastic adhesive foams in United States applications Ser. No. 710,377 and 710,378, filed Aug. 2, 1976, now U.S. Pat. Nos. 4,059,714 and 4,059,466, assigned to the assignee of this application. These patents are directed to methods of making and using hot melt foamed adhesives which offer significant improvements over conventional non-foamed adhesives. According to the techniques described in these applications, the gas is intimately mixed with a thermoplastic adhesive while the adhesive is in a molten state and then the mixture is pressurized to form a solution which, upon dispensing at a lower pressure, releases the gas and foamed adhesive results. The techniques described in these patents result in very useful foamed adhesives and bonding techniques. However, such techniques are not entirely satisfactory in producing hot melt thermoplastic adhesives on a continuous, uniform quality basis. Such techniques have also been found to be limited in their applicability to hot melt thermoplastic materials and further improvements are needed.

SUMMARY OF THE INVENTION

In our copending application Ser. No. 791,338, now U.S. Pat. No. 4,156,754 methods were disclosed predicated in part upon the discovery that dispersions of gas in a molten thermoplastic material can be stabilized by the incorporation of a surfactant in the molten material in a sufficient stabilizing amount. Furthermore, such stabilization or activity can be applied to serve many useful and unique purposes. Indeed, employing the principles of our invention, significant improvements were also disclosed for bonding with hot melt adhesives. Foamed hot melt adhesives having maximum bonding characteristics are achieved by controlling and stabilizing the dispersion of the gas in the hot melt by uniformly distributing surfactant materials throughout the melt for subsequent compression of the melt and release to produce foams having greater bonding strengths with minimum amounts of adhesive.

A significant feature of this invention is its applicability to unlimited classes of hot melt adhesives which for one or more reasons may not be suitable for foam bonding. Moreover, by the method of this invention such diverse thermoplastic materials may be reliably foamed with a uniform quality output of low density foamed thermoplastic material. Process stability and foam properties can be controlled throughout processing in a continuous manner.

Very significantly, in a more preferred mode of bonding, the technique of this invention includes the use of a fluid pressure energy translating device, i.e., a simple single or multistage gear or piston pump, as the pressurizing means. It has been found that the uniform predispersion and stabilization of the gas in the polymeric melt allows for constant pressure solubilization by such a device. Stable dispersions can thus be introduced at the pump intake without gas-locking the pump. Therefore, in this preferred mode, atmospheric air and a simple pump offer considerable reduction in cost in foam bonding.

It has been empirically determined that the life or stability of a hot melt adhesive foam is extended by the incorporation therein of a surfactant even in a very minor amount. Surfactants have been employed which are either soluble in the melt or insoluble, in a finely divided solid state, and stabilization can be achieved. A further advantage of employing a solid phase surfactant is the formation of gas bubbles when pressure is released from the melt composition containing the dissolved gas. Solid phase surfactants have been found to provide and function as nucleating centers. Such nucleating centers lead to more, and smaller, bubbles, more quickly formed from the same amount of dissolved gas. In the absence of nucleating centers, foaming may be and often is delayed after the time of release of pressure. Thus, process versatility where foam delays are desired may be achieved by controlling such nucleating centers.

Synergistic stabilizations have been achieved by a combination of soluble and solid phase surfactants. In other words, the life or stability of a gas dispersion in a hot melt has been extended far beyond the expected life of the algebraic sum of the stability of each component alone in the hot melt composition. It has also been established that the surfactants suitable for use in accordance with the principles of this invention can be anionic, cationic and nonionic types. Versatility, therefore, of both polymeric adhesive materials and surfactant compositions are achieved in accordance with this invention, thereby enabling stabilization of broad classes of compositions with varying physical and chemical characteristics.

In another of its unique aspects, the invention provides a method of process regulation by controlling the variables of surface tension, viscosity, and gas solubility at operating temperatures of the molten material. Surface tension of the molten material is controlled within the range of about 10 to about 40 dynes/cm., preferably about 15 to about 25 dynes/cm. The viscosity of the melt is controlled within a range of about 500 to about 1,000,000 cps., preferably about 1,000–100,000 cps. The gas solubility at dispensing pressure is controlled within the range of about ½ to about 20 cm³ gas/gm. of the hot melt adhesive. Thus, a polymeric composition qualifying for use can be determined by measuring its viscosity, surface tension and solubility. If the viscosity falls below 500 centipoise at application temperature, the molecular weight of the polymer could be increased to raise viscosity to within the specified range. Also, if a diluent is in use, less diluent should be used to increase viscosity. The surface tension may be controlled to within the desired range by the addition of surfactants to the hot melt. Solubility of the gas chosen must be sufficient in the polymeric material to give the useful results. A useful scale is derived from the density of the foamed material as a percent of the density of the unfoamed material and this percentage is a function of the gas solubility at a particular temperature, pressure and composition of the adhesive.

DETAILED DESCRIPTION

As used in this description, the term "thermoplastic hot melt adhesive" or "hot melt adhesive" is a term which is well known in the art and this adhesive material has the characteristics of liquification upon heating and, upon cooling, solidification to a solid, semi-solid or tacky state. Hot melt adhesives or compositions include thermoplastic polymers, for instance, polymers of ethylenically unsaturated monomers, such as polyethylene, polypropylene, polybutylenes, polystyrenes, poly ($\alpha$-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate; styrene and maleic anhydride; styrene and methyl methacrylate; styrene and ethyl acrylate; styrene and acrylonitrile; methyl methacrylate and ethyl acrylate and the like; polymers and copolymers of conjugated dienes such as polybutadiene, polyisoprene, polychloroprene, styrenebutadiene rubber, ethylene-propylene-diene rubber, acrylonitrile-styrene butadiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like. The term "thermoplastic material" is sometimes used herein interchangeably with "hot melt", "melt", "hot melt thermoplastic" or "hot melt adhesive". It is, of course, to be appreciated that all these compositions are characterized by their thermoplastic adhesive nature as above defined.

A number of hot melt adhesive compositions are employed in the operating examples which follow. These and other materials are sometimes identified by trademarks. However, certain of such trademarked materials are defined in *The Condensed Chemical Dictionary*, 8th Edition, Revised by G. G. Hawley, Van Nostrand Reinhold Company, Library of Congress Cat. Card No. 75-133848 (1971). Thus, these definitions are incorporated herein by reference. For example, "EL-VAX" is a copolymer of ethylene vinylacetate (EVA) by DuPont. A conventional polyethylene based adhesive composition is "Eastabond A-3", manufactured by Eastman Chemical Company. In addition, "AC 635" is another polyethylene based composition by Allied Chemical. "Terrell 6100" is a polyester composition and "A-FAX 500" is a polypropylene polymer by Hercules. Polyamides are sold under the trademark "Versalon 1138" by General Mills.

Surfactants, as mentioned above, which have been found to possess the desirable stabilizing activity are selected from the classes of anionic, cationic and nonionic agents, or mixtures thereof. Also, as mentioned, the surfactants can be soluble or dispersible in the melt, or insoluble, as a finely divided solids phase. An anionic surfactant contains a negatively charged ion-containing portion and an oil dispersible cationic portion in the surfactant molecule as is well known. The surfactant of the anionic type may be (1) of the group of saponified fatty acids or soaps, or (2) of saponified petroleum oil such as sodium salts or organic sulfonates or sulfates or (3) of saponified esters, alcohols or glycols, with the latter being well known as anionic synthetic surfactants. Examples of these anionic surfactants include the alkaryl sulfonates or amine salts thereof such as sulfonates of dodecyl benzene or diethanolamine salt of dodecyl benzene sulfonic acid. Most of these sulfonates contain many chemical species. The class name given to most of them is "alkylaryl sulfonate". Simply, this means that a paraffinic hydrocarbon is bonded to an aromatic or benzene nucleus and the aromatic portion has been sulfonated. Examples of saponified fatty acids ($C_6$-$C_{24}$) are the sodium or potassium salts of myristic, palmitic, stearic, oleic or linoleic acids or mixtures thereof. Also, in this class of anionic surfactants are alkali and alkaline earth metal salts of neutral phosphoric acid esters of oxyalkylated higher alkyl phenols or aliphatic monohydric alcohols. "Aerosol OT" is a dioctyl alkali metal sulfosuccinate anionic surfactant made by Cyanamide. The nonionic surfactants suitable for use commonly have hydrophylic portions or side chains usually of the polyoxyalkylene type. The oil soluble or dispersible part of the molecule is derived from either fatty acids, alcohols, amides or amines. By suitable choice of starting materials and regulation of the length of the polyoxyalkylene chain, the surfactant parts of the nonionic detergents may be varied as is well known. Suitable examples of nonoionic surfactants include alkylphenoxy polyoxyethylene glycol, for example, ethylene oxide adduct of either octyl-, nonyl- or tridecyl- phenol and the like. These mentioned nonionic surfactants are usually prepared by the reaction of the alkyl phenol with ethylene oxide. Commercial products are sold under the trademarks "Triton X-100" by Rohm and Haas Co. or "Tergitol" by Union Carbide and Carbon Corp. which are alkyl phenyl ethers of polyethylene glycol. Other specific examples of nonionic surfactants include glyceryl monooleate, oleyl monoisopropanolamide sorbitol dioleate, alkylol amides prepared by reacting alkanolamides such as monoisopropanolamine, diethyanolamine, or monobutanolamine with fatty acids such as oleic, pelargonic, lauric and the like. The cationic surfactants are also well developed and mainly include betaines and quaternary ammonium compounds. Some specific examples of betaines include imidazoline betaines, aliphatic and carboxylic betaines, and betaines with hetero atoms in the hydrophobic chains such as dodecyloxypropyldimethyl aminoacetic acid. Typical of the quaternary ammonium compounds that may be mentioned are dimethyl dicoco ammonium chloride, cetyl pyridinium acetate, methyl cetyl piperidinium propionate, N,N dilauryl, N, N dimethyl ammonium diethyophosphate, and the like. Thus, it will be understood that other anionic, cationic or nonionic surfactants may be employed in accordance with the principles of this invention. In addition, solid surfactants may be employed. Stabilization activity has been achieved with such finely divided solid surfactants as titanium dioxide, carbon black, silicon dioxide, fused silica ("Cab-O-Sil" by Cabot Corporation), iron oxide, chromium oxide, aluminum oxide, clay and the like. These solid phase surfactants also behave as nucleating agents upon release of pressure and dispensing of the solubilized gas and hot melt composition to produce immediate foaming.

Surfactants may also be of the "polymeric" type, i.e., "Surlyn" which is a DuPont trademark for a class of hydrocarbon polymers commonly referred to as ionic hydrocarbon polymers, so named because they contain ionic crosslinks. The polymers and the specific methods by which they may be prepared are fully described and claimed in U.S. Pat. No. 3,264,272, the disclosure of which is incorporated by reference herein. For example, such an ionic hydrocarbon polymer is an ionic copolymer of an $\alpha$-olefin having the formula R—CH=$CH_2$, where R is a radical selected from the class consisting of hydrogen and alkyl radicals from 1 to 8 carbon atoms and $\alpha,\beta$-ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the $\alpha$-olefin and the unsaturated carboxylic acid in which the carboxylic acid groups are randomly distributed over all molecules and metal ions have an ionized valence of usually from one to three and consisting of uncomplexed and complexed metal ions. Other polymeric surfactants such as a nonionic polyvinyl alcohol may be employed or the polyoxyalkylene polymers of the type mentioned above. Thus blends of polymers and polymeric surfactants of the ionic or nonionic type may also be employed according to this invention.

In another variation, the examples which follow demonstrate that EVA copolymer hot melt adhesives require surfactants for stable foaming applications, otherwise foam life is too short to use the foamed adhesive advantages. Surfactants such as Cab-O-Sil fine silica and Aerosol OT sulfo succinate have been very successfully used to gain increased life for foam and better foam operations also. In lieu of adding an ionic polymer such as Surlyn, an additional approach to foam stabilization for EVA hot melts is to make EVA hot melts with increased number of carboxyl groups above the number already present in the resin; these carboxyl groups may be neutralized with bases such as sodium, potassium, lithium, calcium, magnesium, barium and ammonium hydroxides. They may be esterified and otherwise reacted with chemical agents; however, the surfactant imparting character of the carbonyl and carboxyl derived end-groups persists. As such they will be forced to the surface of the molten EVA hot melt and determine the surface tension at a lower value than do other groups (acetate, methyl, alkyl, etc.) present. In this way, the surface tension will be lowered, surface viscosity increased and foam life greatly increased. Methods for increasing the number of carboxyl end-groups in EVA, therefore, includes the blending of EVA resins with resins already developed to have surfactant character such as Surlyn copolymer resin and polyvinyl alcohol (PVA) resins or esterified and modified PVA resins. Further, chemical process conditions, ingredients and operations may be altered to give an EVA resin with increased carboxyl-surfactant character, to wit: (a) oxidize or peroxidize EVA to increase carboxyl content including neutralization and derivitization of the product with chemical agents or (b) make EVA by polymerizations in which the ethylene is polymerized to give a high degree of branching and then add on the vinyl acetate part last to make branched ethylene vinyl acetate block copolymers. The (a) and/or (b) parts can be carried out in very concentrated form and then blended as an additive with large amounts of standard EVA product from existing processes.

The amount of stabilizing surfactant employed in the thermoplastic adhesive composition will vary of course depending upon the type of surfactant, the type of thermoplastic material or polymer base being stabilized, the conditions of operation and the like as will be further amplified by the specific operating examples which follow. Generally, however, the surfactant is only necessary in a minor effective amount of about 0.1 to about 5% by weight of the melt, usually about 0.25 to about 1% by weight. Where the soluble surfactants are employed in combination with the solid phase surfactants in order to achieve superior and even synergistic results, the soluble surfactant is usually employed in the range of about 0.1 to about 5% by weight and the solid surfactant is usually employed in the range of about 0.01 to about 1% by weight. Again, these proportions are very relative and depend upon the specific composition in question and effects desired. As a general guide, it has been found that about 1% of soluble surfactant in combination with 0.1% of solid phase surfactant may be suitably used.

The above described hot melt adhesive formulations are employed in the method of this invention by pressurization of the stabilized dispersion of gas therein, followed by subsequent dispensing to produce a foam. Apparatus disclosed in the abovementioned U.S. Pat. Nos. 4,059,714 and 4,059,466 may be employed. In comparison, however, to the techniques disclosed in said patents, this invention achieves stabilizing effectiveness and control of hot melt adhesive applications. More significantly, as mentioned, this invention insures control of the essential variables of surface tension, viscosity and gas solubility. The surfactant stabilizes the inner phase between the liquid hot melt and the dispersed gas bubbles to achieve the sufficient time stability, allow pumping, dissolving, flow transfer, dispensing and immediate foaming. For instance, following the techniques disclosed in the mentioned patents, a polyethylene "A-3" adhesive is foamable and produces a satisfactory adhesive bond. However, formulation additions of solid and soluble surfactants, for instance Triton X-100 and fused silica, have resulted in improved foams over those made without such additions. The improved foams have lower foam densities, more uniform and finely divided cells, and provide excellent penetration and bonding of substrates. Moreover, by employing the surfactant stabilization technique of this invention, immediate foamability can be achieved and controlled in a fashion which heretofore has not been obtainable. Thus, in accordance with the discoveries and principles of this invention, foamed hot melt adhesives having maximum bonding characteristics are achieved by controlling and stabilizing the dispersion of the gas in the hot melt by uniformly distributing surfactant materials throughout the melt for subsequent compression of the melt and release to produce foams having greater bonding strengths with minimum amounts of adhesive.

In addition to the variability in polymer formulations, different types of gases may be employed in this method including air, nitrogen, oxygen, carbon dioxide, methane, ethane, butane, propane, helium, argon, neon, fluorocarbons such as dichlorodifluoroethane, monochlorotrifluoromethane, or other gases, or mixtures of any of these gases. Such gases can be varied again according to the types of thermoplastic materials employed, conditions and availability of materials. As developed above, such gases can be introduced at low pressure, i.e., ambient or atmospheric up to several pounds per square inch. Various means for melting the adhesive formulations may be used, as exemplified in said U.S. Pat. Nos. 4,059,714 and 4,059,466 or equivalent. Various means for dispersing the gas may be used including but not limited to simple tubes connected to a gas supply, tubes having sintered porous metal tips, perforated baffle plates and motor driven rotary dispersators, to mention a few. Many means for pressurizing and pumping the molten adhesive can be employed. As mentioned above, one of the main advantages of this invention is the enablement of a simple pump to serve as the pressurizing and transfer means. Such means may operate at pressure from about 100 to 2000 psig, preferably in the case of a molten adhesive in the area of about 300 to about 1800 psig. Any suitable means may be employed to dispense the pressurized molten materials onto substrates or into molds as are well known in the art and industry.

In the formulation of the foamable hot melt adhesive, a particular thermoplastic material is mentioned as qualified by measuring its viscosity, surface tension and gas solubility. The viscosity was measured in the following examples at application temperatures following ASTM D3236 (thermosel viscosity). The surface tension was measured following the method of R. H. Dittre, et al, *J. Colloid and Interface Sci.*, 21 367-377 (1966). The solubility of the gas for foaming is measured following the method of D. D. Bonner, et al, *J. Polymer Sci., Polymer Letters Ed.*, 13, 259 (1975).

The principles of this invention will be further understood with reference to the following detailed examples and the drawing in which.

Figure 1:
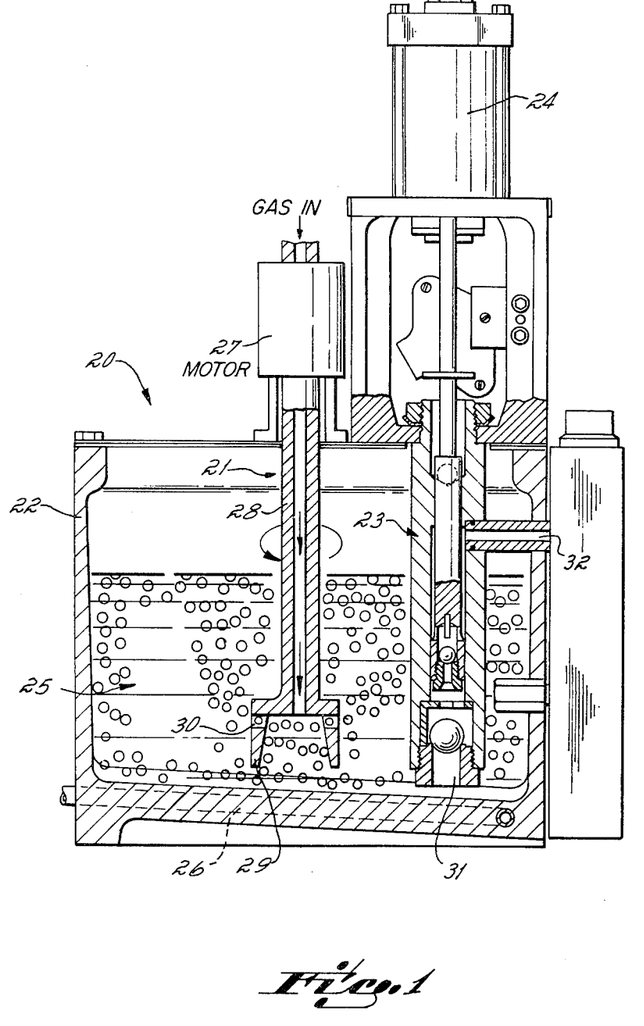
FIG. 1 is a view in section of a thermoplastic melt apparatus useful in the practice of the invention.

Referring to FIG. 1 of the drawings, one form of an apparatus for performing the method is shown. The device employs a reciprocating piston-type pump and further details thereof may be obtained by referring to U.S. Pat. No. 3,585,361, issued June 15, 1971 and assigned to the assignee of this application. The disclosure of this patent is incorporated herein by reference. The structure 20 shown for injecting and mixing gas into a molten thermoplastic material includes a rotary gas injector-mixer 21 disposed in the reservoir or tank 22. The piston pump 23 is attached to the top of the reservoir 22 and is driven by an air operated or electric motor 24. The lower end of the pump 23 is disposed in the molten thermoplastic material 25 which is heated by the heaters 26 mounted in the bottom wall of the tank 22. The injector-mixer has a hollow drive shaft 28 having one end attached to and driven by the motor 27 and a cup-shaped element 29 formed on the opposite end thereof. The motor 27 rotates shaft 28 as gas from an air supply at atmospheric or several pounds pressure is forced downwardly through the hollow shaft 28 into the cup-shaped element 29 and flows out through a plurality of radial outlet ports 30 formed in the side wall of cup 29. As the gas flows from the ports 30 into the hot melt composition 25 according to this invention, it forms a stable dispersion of gas bubbles throughout the molten thermoplastic material 25. This dispersion is only diagrammatically illustrated by the bubbles shown.

As the pump reciprocates, the thermoplastic material containing gas bubbles is drawn into the pump inlet port 31, compressed and discharged through the outlet port 32 in the manner described in U.S. Pat. No. 3,585,361.

The process is operated by introducing a thermoplastic material composition meeting the formulation criteria into tank 22. The power to the heaters 26 is turned on and the thermoplastic material melted at the melt or application temperature. Atmospheric air from about 0-10 pounds pressure is supplied to the hollow drive shaft 28. Power is then supplied to drive the rotary mixer 21. Air bubbles of varying size are thus dispersed, and stabilized in the melted thermoplastic material by the mixer. The liquid with dispersed bubbles is drawn into the pump inlet port 31. In the pump, the liquid and gas bubbles are compressed into a single liquid phase and delivered at a regulated pressure through the outlet port 32. In an adhesive application system, the hot melt adhesive would be delivered through a heated hose and then to a dispensing valve and nozzle in a manner not shown. As the hot melt material is delivered from the outlet port or dispensing valve, it foams in a very short time due to the high pressure being released on the melt material containing dissolved gas. Where the melt composition of this invention is employed as an adhesive, it may be applied as a ribbon onto, for example, corrugated packaging box flaps. The ribbon will swell in volume and, when the box flaps are pressed together, foamed adhesive flows therebetween easily and fully. By reason of the characteristics of the foamed thermoplastic material, it penetrates the pores of the paper as it spreads, losing the gas content of the foam through the pores until the glue line reaches the set (no flow) point temperature. Employing thermoplastic adhesive compositions of this invention, the resulting glue line is stronger, is formed faster, uses less glue and is substantially free of bubbles in its final state.

Additional foamable hot melt adhesive compositions may be added to the tank 22 to replenish that pumped. The gas supply through the mixer 21 may be adjusted to control the proportion of the gas to the thermoplastic composition. Should the proportion of the gas to the thermoplastic material exceed the solubility of the gas in the material at the pressure set by a regulator for the application temperature, the amount of gas can be reduced. Otherwise the gas phase will tend to accumulate in the pump, interrupt its operation and also interrupt the thermoplastic flow. The optimum condition of operation exists when the gas supply to adhesive ratio is equal to gas solubility at the application temperature and the regulated set pressure. Under these circumstances, the thermoplastic adhesive may be delivered to foam on a surface or substrate for bonding at lowest density without interruption and with maximum efficiency.

In order to evaluate the foamable composition and stabilizing effectiveness of the method of this invention, the foam life of a number of hot melt materials was determined employing surfactants in accordance with the principles of this invention. For this purpose, reference is made to the Table which follows in which a number of thermoplastic materials including ethylene vinylacetate, polyethylene, polyester, polypropylene and polyamide were employed.

TABLE

| Adhesive Type | Surfactant | % by wt. | Solid Surfactant | % by wt. | Other Additives/ Blowing Gas | % by wt. | Temp. °F. | Viscosity cps. | Surface Tension dynes/cm. | Foam/liquid ratio | Hydraulic Pressure (psig) | t½ min. | Foam Density (g/cc) |
|---|---|---|---|---|---|---|---|---|---|---|---|---|---|
| EVA (Elvax 410) | | 0 | | 0 | air | 0 | 350 | 28,000 | 22.4 | | | | 0.37 |
| | nonionic | 0.25 | fused silica | 0.1 | air | 0 | 350 | 28,000 | | | | | 0.34 |
| | | 0 | | 0 | wax/air | 30 | 350 | 3,100 | 19.5 | 1.77 | 1100–1200 | 5.9 | |
| | | 0 | fused silica | 0.1 | wax/air | 30 | 350 | 3,100 | | 1.69 | 1100–1200 | 12.5 | |
| | nonionic | 1.0 | | 0 | wax/air | 30 | 350 | 3,100 | | 1.98 | 1100–1200 | 5.1 | |
| | nonionic | 1.0 | fused silica | 0.1 | wax/air | 30 | 350 | 3,100 | | 1.68 | 1100–1200 | 15.0 | |
| | cationic | 1.0 | | 0 | wax/air | 30 | 350 | 3,100 | | 1.75 | 1100–1300 | 3.6 | |
| | | 0 | carbon black | 0.1 | wax/air | 30 | 350 | 3,100 | | 1.75 | 1100–1300 | 15.6 | |
| | | 0 | $TiO_2$ | 0.1 | wax/air | 30 | 350 | 3,100 | | 2.20 | 1100–1300 | 9.3 | |
| | anionic (OT) | 1.0 | | 0 | wax/air | 30 | 350 | 3,100 | | 1.98 | 1100–1300 | 44.5 | |
| | anionic (OT) | 1.0 | fused silica | 0.1 | wax/air | 30 | 350 | 3,100 | | 2.22 | 1100–1300 | 102.3 | |
| | anionic (Dupanol) | 1.0 | fused silica | 0.1 | wax/air | 30 | 350 | 3,100 | | 1.92 | 1100–1300 | 1.8 | |
| | anionic (OT) | 1.0 | fused silica | 0.1 | wax/$N_2$ | 30 | 350 | 3,100 | | 3.81 | | 201.0 | 0.30 |
| | anionic (OT) | 1.0 | fused silica | 0.1 | wax/$CO_2$ | 30 | 350 | 3,100 | | 2.35 | | 120.0 | 0.45 |
| | anionic (Surlyn) | 1.0 | fused silica | 0.1 | wax/air | 30 | 350 | 3,100 | | 4.15 | | 34.0 | 0.29 |
| | anionic (Surlyn) | 1.0 | fused silica | 0.1 | wax/$N_2$ | 30 | 350 | 3,100 | | 4.27 | | 45.0 | 0.29 |
| | anionic (Surlyn) | 1.0 | fused silica | 0.1 | wax/$CO_2$ | 30 | 350 | 3,100 | | 3.22 | | 32.0 | 0.29 |
| | PVA | 1.0 | fused silica | 0.1 | wax/air | 30 | 350 | 3,100 | | 5.12 | | 0.6 | |
| | PVA | 1.0 | fused silica | 0.1 | wax/$CO_2$ | 30 | 350 | 3,100 | | 5.56 | | 3.0 | |
| | PVA | 1.0 | fused silica | 0.1 | wax/$N_2$ | 30 | 350 | 3,100 | | 3.91 | | 5.5 | |
| | anionic (Sarkosyl) | 1.0 | fused silica | 0.1 | wax/air | 30 | 350 | 3,100 | | 3.74 | | 0.3 | |
| | anionic (Sarkosyl) | 1.0 | fused silica | 0.1 | wax/$CO_2$ | 30 | 350 | 3,100 | | — | | — | |
| | anionic (Sarkosyl) | 1.0 | fused silica | 0.1 | wax/$N_2$ | 30 | 350 | 3,100 | | 3.55 | | 0.3 | |
| | A-3 | 1.0 | fused silica | 0.1 | wax/air | 30 | 350 | 3,100 | | — | | — | |
| | A-3 | 1.0 | fused silica | 0.1 | wax/$CO_2$ | 30 | 350 | 3,100 | | 6.59 | | 0.5 | |
| | A-3 | 1.0 | fused silica | 0.1 | wax/$N_2$ | 30 | 350 | 3,100 | | 3.30 | | 0.5 | |
| | A-3 | 5.0 | fused silica | 0.1 | wax/air | 30 | 350 | 3,500 | | 2.77 | | — | |
| | A-3 | 5.0 | fused silica | 0.1 | wax/$N_2$ | 30 | 350 | 3,500 | | 4.19 | | — | |
| | A-3 | 5.0 | fused silica | 0.1 | wax/$CO_2$ | 30 | 350 | 3,500 | | 6.99 | | 0.6 | |
| | A-3 | 10.0 | fused silica | 0.1 | wax/air | 30 | 350 | | | 3.43 | | — | |
| | A-3 | 50.0 | fused silica | 0.1 | wax/air | 30 | 350 | | | 2.92 | | — | |
| | AFAX 900C | 1.0 | fused silica | 0.1 | wax/air | 30 | 350 | 3,100 | | 2.99 | | — | |
| Polyethylene (AC-635) | | 0 | | 0 | air | 0 | 350 | 2,800 | 23.3 | 1.40 | 1300–1400 | 18.2 | |
| | | 0 | fused silica | 0.1 | air | 0 | 350 | 2,800 | | 1.57 | 1300–1400 | 28.1 | |
| | nonionic | 1.0 | | 0 | air | 0 | 350 | 2,800 | | 1.44 | 1300–1400 | 36.3 | |
| | nonionic | 1.0 | fused silica | 0.1 | air | 0 | 350 | 2,800 | | 1.48 | 1300–1400 | 97.5 | |
| | anionic (OT) | 1.0 | | 0 | air | 0 | 350 | 2,800 | | 1.53 | 900–1000 | 46.0 | |
| | cationic | 1.0 | | 0 | air | 0 | 350 | 2,800 | | 1.42 | 900–1000 | 77.5 | |
| | | 0 | carbon black | 0.1 | air | 0 | 350 | 2,800 | | 1.27 | 900–1000 | 97.4 | |
| | | 0 | $TiO_2$ | 0.1 | air | 0 | 350 | 2,800 | | 1.46 | 900–1000 | 105.0 | |
| | cationic | 1.0 | fused silica | 0.1 | air | 0 | 350 | 2,800 | | 1.75 | 900–1000 | 114.0 | |
| Polypropylene (A-FAX- | | 0 | | 0 | BHT/air | 0.3 | 420 | 1,900 | 20.2 | 1.61 | 900–1000 | 55.7 | 0.47 |
| | | 0 | fused silica | 0.1 | BHT/air | 0.3 | 420 | 1,900 | | 1.60 | 900–1000 | 58.6 | |

TABLE-continued

| Adhesive Type | Surfactant | % by wt. | Solid Surfactant | % by wt. | Other Additives/ Blowing Gas | % by wt. | Temp. °F. | Viscosity cps. | Surface Tension dynes/ cm. | Foam/ liquid ratio | Hydraulic Pressure (psig) | t½ min. | Foam Density (g/cc) |
|---|---|---|---|---|---|---|---|---|---|---|---|---|---|
| 500) 900C | nonionic | 1.0 |  | 0 | BHT/air | 0.3 | 420 | 1,900 |  | 1.69 | 900–1000 | 49.5 |  |
|  | nonionic | 1.0 | fused silica | 0.1 | BHT/air | 0.3 | 420 | 1,900 |  | 1.62 | 900–1000 | 56.4 |  |
|  | nonionic | 1.0 | fused silica | 0.1 | BHT/air | 0.3 | 400 | 3,100 |  | 1.68 | 1000–1100 | 61.5 |  |
|  | anionic (OT) | 1.0 | fused silica | 0.1 | BHT/N₂ | 0.3 | 420 | 1,900 |  | 5.77 |  | 39.2 |  |
|  | anionic (OT) | 1.0 | fused silica | 0.1 | BHT/CO₂ | 0.3 | 420 | 1,900 |  | 6.71 |  | 36.0 |  |
|  | anionic (OT) | 1.0 | fused silica | 0.1 | BHT/air | 0.3 | 420 | 1,900 |  | 6.16 |  | 33.6 |  |
|  | anionic (Dupanol) | 1.0 | fused silica | 0.1 | BHT/N₂ | 0.3 | 420 | 1,900 |  | 4.11 |  | 45.8 | 0.27 |
|  | anionic (Dupanol) | 1.0 | fused silica | 0.1 | BHT/CO₂ | 0.3 | 420 | 1,900 |  | 8.79 |  | 16.3 | 0.30 |
|  | anionic (Dupanol) | 1.0 | fused silica | 0.1 | BHT/air | 0.3 | 420 | 1,900 |  | 6.64 |  | 44.5 | 0.28 |
|  | cationic | 1.0 | fused silica | 0.1 | BHT/N₂ | 0.3 | 420 | 1,900 |  | 4.74 |  | 33.0 | 0.30 |
|  | cationic | 1.0 | fused silica | 0.1 | BHT/CO₂ | 0.3 | 420 | 1,900 |  | 6.18 |  | 17.4 | 0.31 |
|  | cationic | 1.0 | fused silica | 0.1 | BHT/air | 0.3 | 420 | 1,900 |  | 3.96 |  | 29.3 | 0.33 |
| Polyamide (Versalon) 1138) |  | 0 |  | 0 | air | 0 | 420 | 2,800 | 30.7 | 1.54 | 1400–1500 | 1.0 | 0.39 |
|  | nonionic | 1.0 |  | 0 | air | 0 | 420 | 2,800 | 18.8 | 1.48 | 1400–1500 | 2.0 |  |
|  |  | 0 | fused silica | 0.1 | air | 0 | 420 | 2,800 | 20.8 | 1.50 | 1400–1500 | 1.5 |  |
|  | nonionic | 1.0 | fused silica | 0.1 | air | 0 | 420 | 2,800 | 18.3 | 1.54 | 1400–1500 | 3.0 |  |
|  | nonionic (X-102) | 1.0 | fused silica | 0.1 | air | 0 | 420 | 2,800 |  | 1.40 | 1400–1500 | 4.0 |  |
|  | nonionic (Surfonic N-60) | 1.0 | fused silica | 0.1 | air | 0 | 420 | 2,800 |  | 1.73 | 1400–1500 | 0.8 |  |
|  | anionic | 1.0 |  | 0 | air | 0 | 420 | 2,800 |  | 2.00 | 1400–1500 | 0.5 |  |
|  | anionic (Dupanol) | 1.0 |  | 0 | air | 0 | 420 | 2,800 |  | 1.87 | 1400–1500 | 0.25 |  |
|  | cationic | 1.0 |  | 0 | air | 0 | 420 | 2,800 |  | 2.25 | 1400–1500 | 0.66 |  |
| Polyethylene A-3 |  | 0 |  | 0 | air | 0 | 350 | 2,700 | 15.2–17.0 |  | 1400–1600 | >120 | 0.39 |
|  |  | 0 |  | 0 | air | 0 | 400 | 1,450 |  | 1.57 | 1400–1600 | 110.0 |  |
| Polyester (Terrell 6100) |  | 0 |  | 0 | air | 0 | 420 |  |  | 1.90 | 1700–1800 | 16.2 | 0.43 |
|  | nonionic | 1.0 | fused silica | 0.1 | air | 0 | 420 |  |  | 2.37 | 1700–1800 |  | 0.49 |
|  | anionic (Dupanol) | 1.0 |  | 0 | air | 0 | 420 |  |  | 2.22 | 1700–1800 | >160.0 |  |
|  |  | 0 | TiO2 | 0.1 | air | 0 | 420 |  |  | 2.18 | 1700–1800 | >140.0 |  |
|  | cationic | 1.0 |  | 0 | air | 0 | 420 |  |  | 2.45 | 1700–1800 | 76.6 |  |
| Polyester (Goodyear) Vituf 5126 |  | 0 |  | 0 | air | 0 | 420 | 60,000 |  | 1.12 |  | 76.5 |  |
|  | anionic (Dupanol) | 1.0 | fused silica | 0.1 | air | 0 | 420 | 60,000 |  | 1.13 |  | >120.0 |  |

Referring to the Table, the "nonionic" surfactant employed was Triton X-100, identified above. The "nonionic (X-102)" was an octylphenoxy (polyethoxy)$_{12-13}$ ethanol by Rohm & Haas. The "nonionic Surfonic N-60" by Jefferson Chemical Co. was a nonylphenoxy (polyethoxy)$_6$ ethanol. The cationic surfactant employed was dimethyl dicoco ammonium chloride and "anionic OT" surfactant was dioctyl alkali metal sulfosuccinate, identified above. The "anionic Sarkosyl" was sodium lauroyl sarcosinate and "Dupanol" was DuPont Dupanol WA paste of sodium loryl sulfate. The adhesive types were identified above with the exception of polyester Goodyear Vituf 5126, which is a polyethylene terephthalate copolymer having 20 eq/10$^6$ grams carboxyl equivalents. "Surlyn" has been identified above. The fused silica employed as a solid surfactant was "Cab-O-Sil", supra, having a surface area of approximately 900 square meters per gram (Standard grade M5 by Cabot). The fused silica is a colloidal silica where the particles are sintered together in chain-line formations. The designation "BHT" is an abbreviation for butylated hydroxytoluene. The "PVA" is a 99–100% hydrolyzed poly(vinyl alcohol). The Table thus embodies a tabulation of a number of operating examples employing thermoplastic adhesive compositions which have been processed according to the method of stabilization of this invention. The data tabulated were obtained with a hot melt apparatus similar to that described for FIG. 1. It is important to emphasize that the results reported in the Table are valid to be reproduced only under all the conditions under which they were obtained. These conditions include the overall foam to liquid ratio at the time of formation of the foam. These data are also relative to the amount of air or other gas dissolved in the polymeric hot melt before foam formation whether or not the polymeric hot melt is or is not saturated with dissolved gas at the pressure and temperature in effect before foaming. Hydraulic pressure during dispensing of the pressurized polymeric liquid hot melt should be observed. All of these studies to determine the life of the foam were dynamic. Where the half-life (t ½) is indicated as—, this means no measurable reading was obtained.

The tabular data were obtained with adhesive compositions both with and without surfactants, as indicated on a percent by weight basis. In certain of the ethylene vinylacetate (EVA) and polypropylene adhesives, wax and BHT additives were employed. The operating temperature for a particular composition which is processed throughout the melt tank, transfer and dispensing lines is indicated in the Table in degrees Fahrenheit. The viscosity and surface tension measurements were made according to the methods described above. The foam stabilities, i.e., half-lives (t ½), were determined as illustrated by the plots in FIG. 6 of the drawings. The foam life was determined according to the formula:

$$\text{Percent foam (air)} = \left(\frac{V_E - V_i}{V_O - V_i}\right) \times 100$$

Figure 6A:
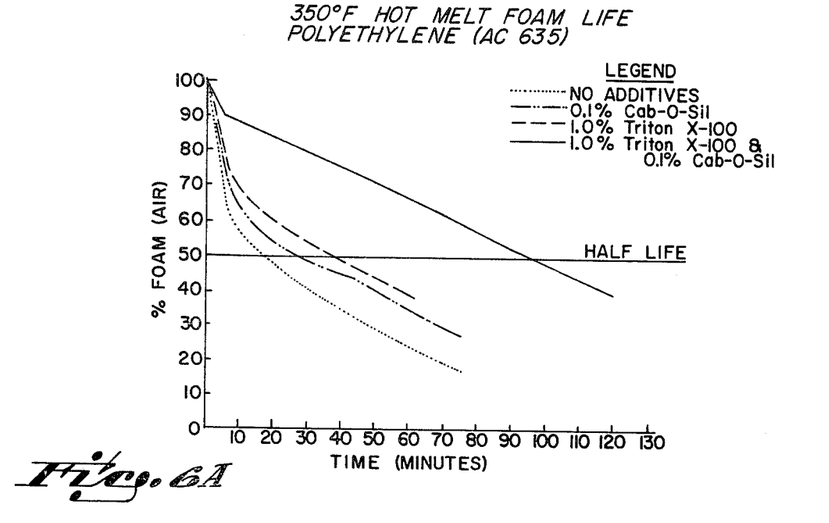
FIGS. 6A to 6D are plots of stability data illustrating the stabilizing effects of the method of this invention.

$V_E$ = total volume of foam and liquid at each time interval from experimental data $V_i$ = volume of liquid contained in a graduated cylinder after de-airing $V_O$ = initial volume of foam from first experimental point data With reference to the above formula and FIG. 6A of the drawing, the half-life for foamed polyethylene at 350° F. was obtained and reported in the Table. FIG. 6A is a plot in terms of percent foam vs. time lapsed for foam sample dispensed from an apparatus of the type discussed above with reference to FIG. 1. A sample of foam was taken from an outlet port similar to that shown in the drawing at point 32 through a dispensing head into a 250 cc graduated cylinder at a beginning foam thickness of 6 inches (150 cc). That sample is given the 100% foam value plotted in FIG. 6. Then, the time in minutes for the total volume of foam and liquid at each time interval was observed until the volume of liquid in the graduated cylinder was de-aired. With reference to FIG. 6A, then, it may be observed that the polyethylene polymer, without any additives, had a stability (t ½) of 18.2 minutes. Upon the addition of a solid surfactant, i.e., fused silica in an amount of about 0.1%, the half-life was improved to about 28.1 minutes. Upon the separate addition of the nonionic surfactant in an amount of about 1%, the half-life of the foam polyethylene was improved to about 36.3 min. Upon the combination of the soluble and solid phase surfactants in the same amounts to the polyethylene melt, the half-life was improved to 97.5 minutes. Therefore, the data from the Table and FIG. 6A with respect to the polyethylene thermoplastic material clearly illustrate that either a soluble or solid surfactant material when separately added, in accordance with the principles of this invention, advantageously stabilizes the dispersion of gas in a thermoplastic melt material. Furthermore, as demonstrated by the response of the combined soluble and solid surfactants, the stabilization of the combination far exceeds the expected algebraic sum of the activity of the individual components. Such synergistic results are indeed remarkable.

Figure 2:
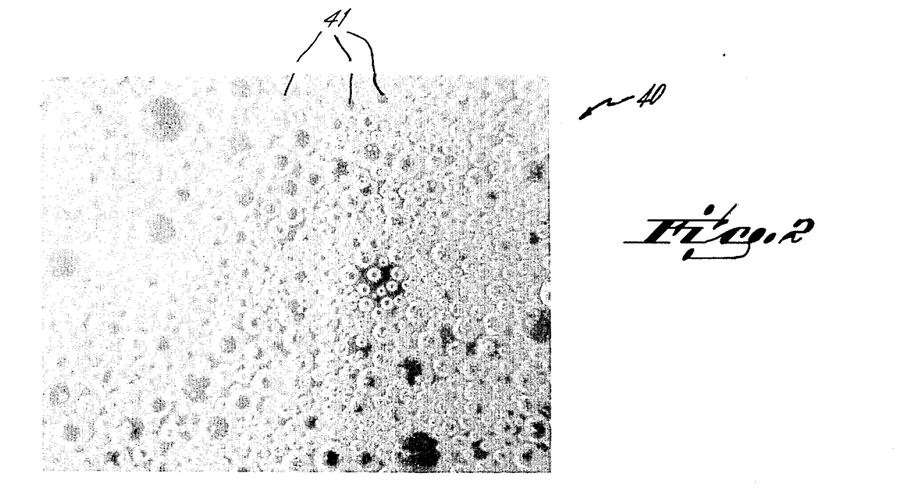
FIG. 2 is a photograph magnified 20 times of a cross-section through a polyethylene adhesive foam made without a surfactant.
Figure 3:
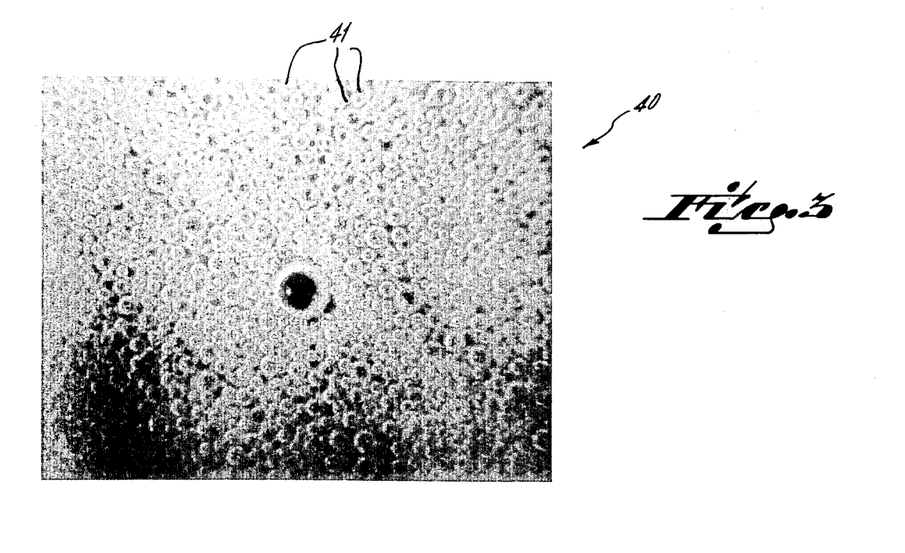
FIG. 3 is a photograph magnified 20 times of a cross-section through a polyethylene adhesive foam made in accordance with the practice of this invention.

The character of foams produced with or without the surfactants according to the principles of this invention are illustrated by the drawings FIGS. 2-5. In FIGS. 2 and 3, a polyethylene based adhesive composition, i.e., A-3, foamed without and with additives is respectively depicted. With reference to these FIGS. 2-3, the foam produced with surfactant stabilization is of more uniform and finer distribution of cell sizes than in the material without surfactants. There is a significant improvement offered by this invention in cell size and uniformity of distribution, with resultant enhanced bonding and penetration of the adhesive foam into porous substrates. Furthermore, as developed above, control of foam formation upon dispensing can be achieved with this invention, whereas such control is not available for the use of the A-3 polyethylene alone. With reference to FIGS. 2 and 3, the foam 40 has closed air cells 41 spaced throughout the foam and created by the entrapment of air bubbles evolved from a solution of gas in the liquid molten adhesive. These cells 41 are formed after the liquid adhesive-air solution is dispensed from an adhesive dispenser of the type illustrated in FIG. 1.

Figure 4:
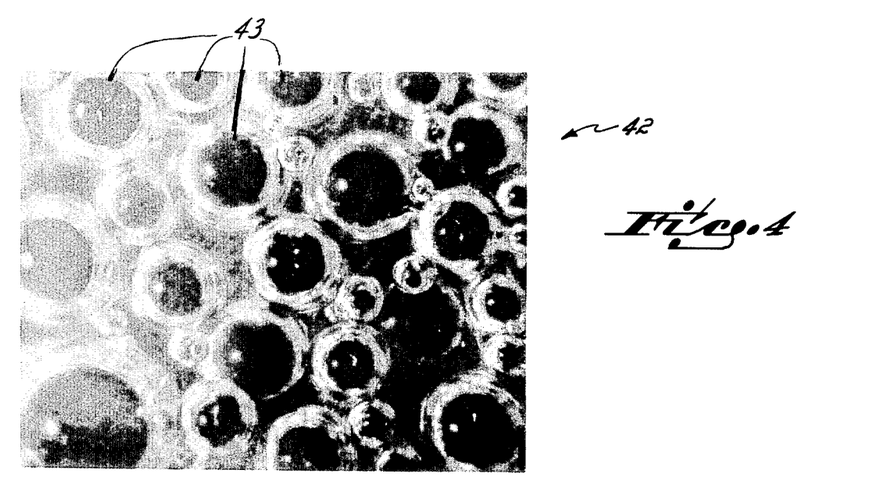
FIG. 4 is a photograph magnified 20 times of a cross-section through an ethylene vinylacetate adhesive foam made without a surfactant.
Figure 5:
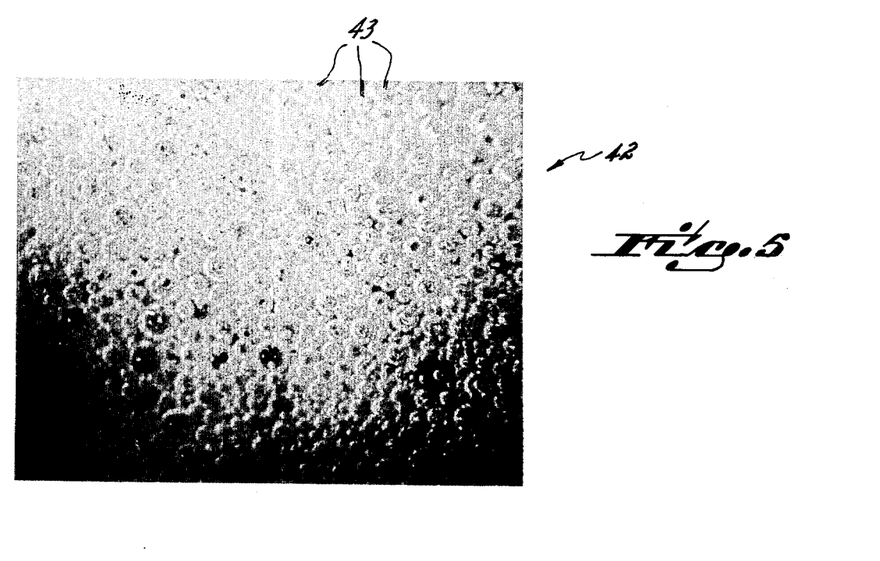
FIG. 5 is a photograph magnified 20 times of a cross-section through an ethylene vinylacetate adhesive foam made with stabilizing surfactants in accordance with this invention.

An ethylene vinylacetate adhesive composition is illustrated by FIGS. 4 and 5, without and with foam stabilization, respectively. FIG. 5 clearly illustrates that a more uniform and finer distribution of foam cells is achieved by stabilization according to the principles of this invention.

Figure 6B:
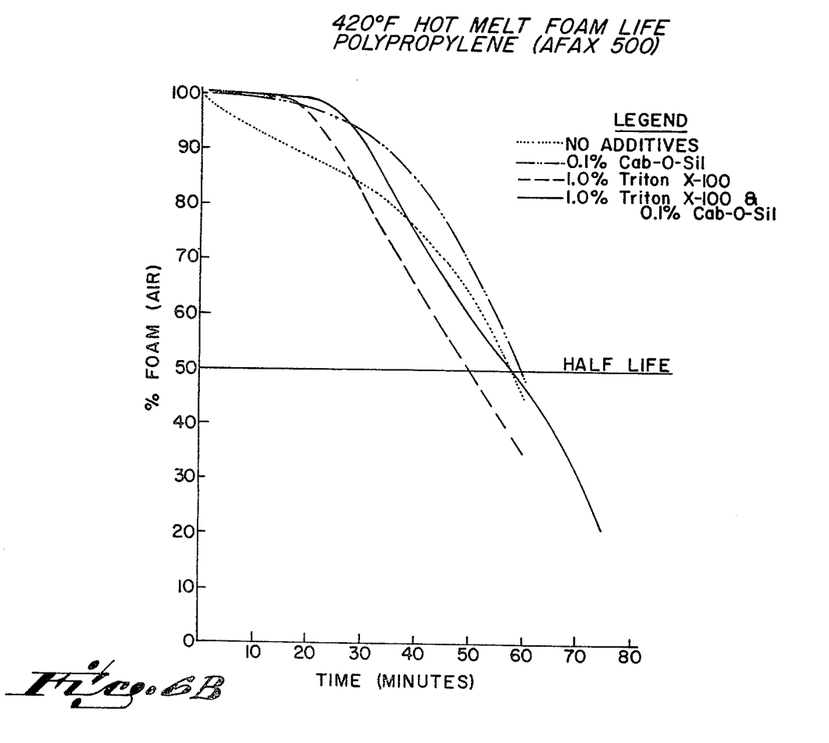
Figure 6C:
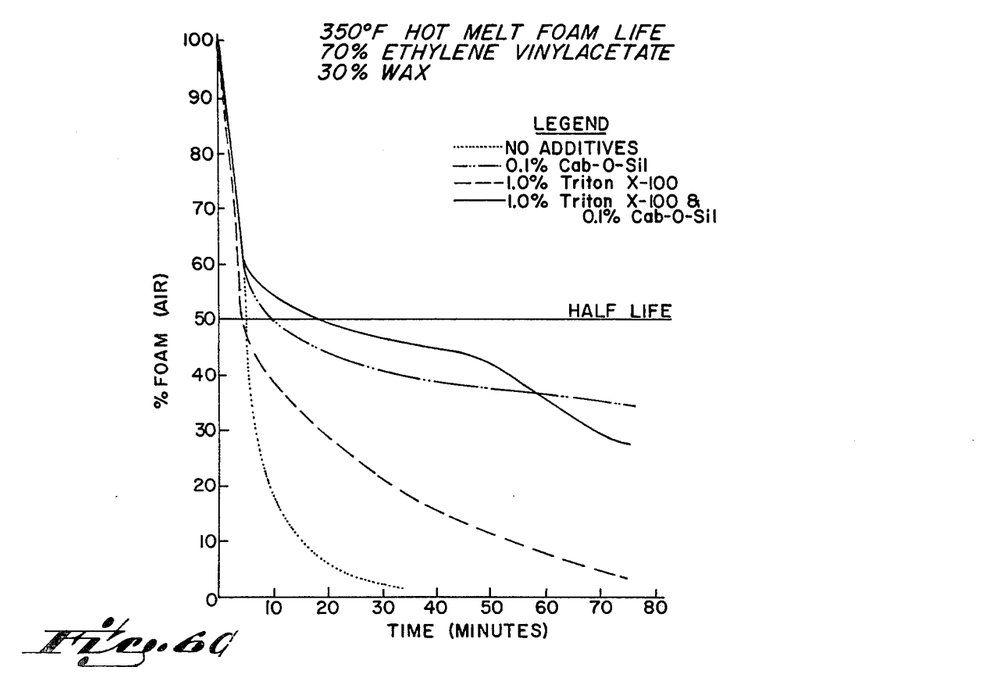

Half-life stabilities reported in the Table for polypropylene and ethylene vinylacetate (70% EVA, 30% wax) were determined by FIGS. 6B and C. The EVA/wax and polypropylene curves represent opposite extreme prototypes. Briefly, the difference in these two examples is explained by the two basic foam decay mechanisms (1) diffusion of the bubble gas from small bubbles into big bubbles and (2) drainage of the liquid phase downward (due to gravity) out from between the bubbles. It is also necessary to keep in mind the physical characteristics of surface tension, viscosity, diffusion coefficient and the gas solubility in liquid. Polypropylene is several times a better barrier material than polyethylene because of its molecular architecture, hence it resists diffusion several times more than polyethylene or EVA/wax systems. Therefore, the delay in diffusion decay appears in FIG. 6B at the beginning for the polypropylene material during which time the liquid is draining from between the bubbles bringing them closer together. When they get a certain distance apart, diffusion increases, as the distance between bubbles decreases and, therefore, the curve of polypropylene falls off toward zero with time. In contrast, EVA/wax has a very low resistance to diffusion because of the 30% wax diluent, hence the curve starts and falls with no detected delay within the limit of the experimental half-life. However, it can be observed that improvements in regard to stability are evident in the latter portions on these curves.

Figure 6D:
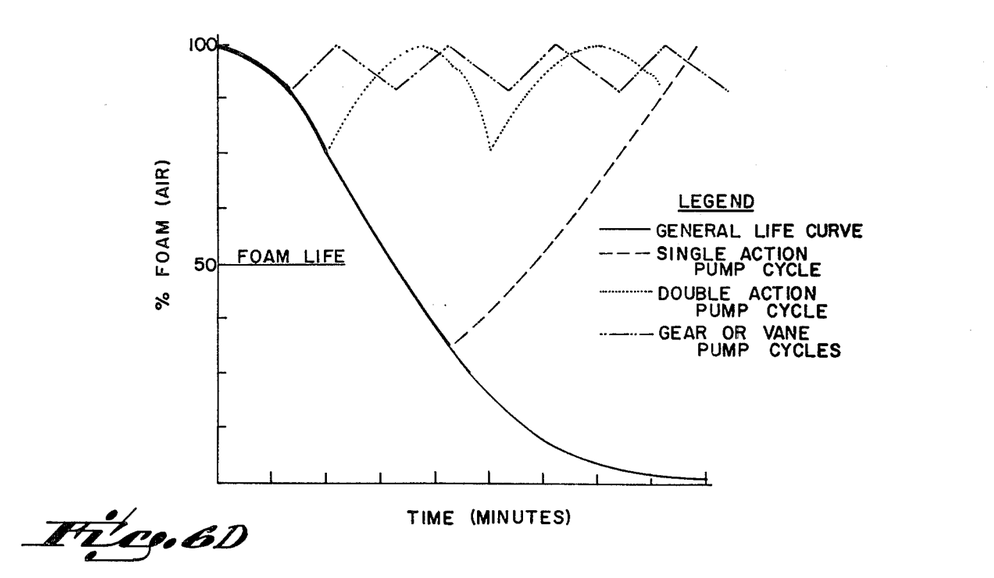

From FIGS. 6A-C, a generalized curve shown by the solid line in 6D represents the best present knowledge of the overall situation. All of the data presented in the Table and FIGS. 6A-C are dynamic, as mentioned above. With reference to the generalized FIG. 6D, the solid black line represents foam life measured on a pressurized sample from point of pressure release (100% foam, 0 time) to total decay (0% foam, infinite time). In practice of the process, such a foam will decay, as indicated by the broken curves, around the vicinity of any pressurizing device intake or gas dispersing device, whether separate or combined. When a combined dispersing-gear pump device undergoes one or more successive dispersing, pressurizing, dispersing, pressurizing, etc., cycles, the foam bubble system will also cycle as indicated on the diagram by the curves (FIG. 6D). Dependent upon the design of the device, the cycling will be either as in the dashed curve (single action reciprocating pump); intermediate as in the dotted curve (double action reciprocating pump); or shallow as in the dotted and dashed curve (gear pump with many teeth of limited depth or rotary sliding vane pump) (FIG. 6D). The area between the curves and the horizontal line at 100% foam is an inverse measure of the efficiency of the system-device. The ideal device will succeed in paralleling the 100% line, converting the entire (100%) bubble assembly into pressurized liquid phase in one cycle. Total failure is exemplified by two extreme cases: (1) very deep cycle with no finite recovery and (2) finite recovery, infinite number of cycles (no through-put).

The half-life values of the Table for compositions containing 0.1% carbon black, 0.1% titanium dioxide, 1% Aerosol OT, or 1% dimethyl base coco ammonium chloride were determined in a manner similar to that of FIGS. 6A–C. Each of such half-life curves demonstrates a very significant stabilization of the thermoplastic polymeric compositions in question. It should be mentioned that the tabulated polyester example (Terrell 6100) demonstrated enhanced stability by the employment of the surfactants according to this invention. However, after approximately 80 minutes of testing, a skin formed across the top of the samples in the graduated cylinder and the experiment was terminated.

Other observations may be made with reference to the Table. Foamable compositions of EVA and anionic (OT) surfactant with fused silica exhibited stabilities with air, $N_2$ and $CO_2$ which far exceeded the nonionic surfactant activity. Furthermore, the anionic (OT) examples demonstrated synergism between soluble and solid surfactants. The anionic polymer surfactant (Surlyn) also demonstrated excellent foam stabilities for each of the gasses. In contrast, the nonionic or cationic components did not improve or even tended to diminish stability of the EVA polymer itself. This also was the case with nonionic PVA. Furthermore, anionic Dupanol, slightly anionic Sarkosyl, A-3 or AFAX 900C did not improve or even tended to diminish stability of the EVA itself. Therefore, these data demonstrate that particular surfactants and combinations thereof, with polymeric adhesive components will vary to get preferred and synergistic results. Here polyethylene vinylacetate and alkyl phenoxy polyethoxy ethanol or anionic hydrocarbon polymer provided the best results.

In the case of pure polyethylene AC-635, all three types of surfactants and solid surfactants provided superior or synergistic foamable compositions. However for polypropylene (AFAX), none of the surfactants improved the base composition containing BHT as the antioxidant. This illustrates, according to applicants' present understanding that carboxylate or oxygenated end groups of the polymer itself, as a result of oxidation or degradation, provides a polymer system which best stabilizes itself. Whereas A-3, polyethylene, also provides a stable system by itself, as stated above and represented by the Table, improvements can be achieved by employing surfactants according to this invention. The behavior of A-3 is also believed attributable to end groups of the oxygenated type as with AFAX polypropylene.

In the case of a polyamide, as shown by the Table, improvements and synergism are achieved with a nonionic surfactant, whereas anionic or cationic surfactants have not such results with air. Where a polyester is employed, such polymers are foamable by themselves because of the nature of the polymer and ionic end groups of the carboxylic salt, hydroxyl or ester type. Nevertheless, anionic surfactants exceedingly enhance foamability.

In view of the above description and detailed operating examples, it will become apparent that there are other obvious modifications in accordance with the principles of this invention. Such modifications may be made by one of ordinary skill in the art without departing from the spirit and scope hereof.

What is claimed is:

1. The method of bonding with a foamed thermoplastic adhesive which comprises
   first stabilizing a dispersion of gas bubbles in a molten thermoplastic by incorporating in the molten thermoplastic a surfactant in a sufficient gas-stabilizing amount,
   subsequently pressurizing said dispersion to form a hot solution of the gas in the molten thermoplastic,
   dispensing said hot solution under lower pressure whereby said gas is released from said solution to form a hot foamed material, and
   compressing the hot foam between two substrates to force the gas from the foam and to form a bond between the substrates.

2. The method of claim 1 wherein said gas is air.

3. The method of claim 2 wherein said pressurizing step is conducted at pressures on an order of about 100 to about 2,000 psig.

4. The method of claim 1 wherein said pressurizing step is conducted by means of a pump.

5. The method of claim 1 wherein air is dispersed in the molten thermoplastic material and stabilized under substantially atmospheric pressure followed by said pressurization by means of a fluid pressure translating device.

6. The method of claim 5 wherein said device is a pump.

7. The method of claim 1 wherein said surfactant is contained in an amount of about 0.1% to about 5% by weight.

8. The method of claim 1 wherein said surfactant is a solid phase surfactant.

9. The method of claim 8 wherein said solid phase surfactant is a finely divided inert material.

10. The method of claim 1 wherein said surfactant is a mixture of a surfactant soluble in the molten thermoplastic and a finely divided solid surfactant insoluble in the molten thermoplastic.

11. The method of claim 10 wherein said soluble and solid surfactants are present in a ratio to provide a synergistic stabilizing effectiveness to said dispersion.

12. The method of claim 10 wherein said soluble surfactant is contained in an amount of about 0.1 to about 5% by weight and said solid surfactant is contained in an amount of about 0.01 to about 1% by weight.

13. The method of claim 1 wherein said surfactant is selected from the group consisting of anionic,, cationic and nonionic surfactants, and mixtures thereof.

14. The method of claim 1 wherein said thermoplastic material comprises a polymer selected from the group consisting of polymers of ethylenically unsaturated monomers, polymers of conjugated diene monomers, polyesters, polyamides, polyesteramides and polyurethanes, and copolymers of said monomers.

15. The method of claim 1 wherein said stabilization is conducted by controlling the surface tension of said molten material within the range of about 10–40 dynes/cm., the viscosity being controlled within the range of about 500–1,000,000 cps and wherein the gas solubility at said dispensing pressure is within the range of about ½–20 cm$^3$ gas/gm of thermoplastic material.

16. The product produced by the method of claim 1.

17. The product produced by the method of claim 10.

18. The product produced by the method of claim 11.

19. The product produced by the method of claim 13.

20. The product produced by the method of claim 14.

21. The method of claim 1 wherein the molten thermoplastic comprises a copolymer of ethylene and vinylacetate and said surfactant is an anionic surfactant.

22. The method of claim 21 wherein said surfactant is dioctyl alkali metal sulfosuccinate.

23. The method of claim 22 wherein said molten thermoplastic includes a finely divided inert material to achieve a synergistic foam stabilizing effectiveness.

24. The method of claim 1 wherein said surfactant is an anionic hydrocarbon polymer.

25. The method of claim 1 wherein the molten thermoplastic comprises polyethylene and said surfactant is selected from the class of surfactant soluble in the molten thermoplastic and finely divided solid surfactant, insoluble in the molten thermoplastic, and mixtures thereof.

26. The method of claim 25 wherein said mixtures are in a ratio to provide synergistic foam stabilizing effectiveness.

27. A method of claim 1 wherein the molten thermoplastic comprises a polyester and an anionic surfactant.

28. The method of claim 27 wherein said surfactant contains a solid phase surfactant.

29. The method of claim 28 wherein said solid phase surfactant is a finely divided inert material.

30. A method of claim 1 wherein the molten thermoplastic comprises
a polyolefin polymer having a group containing oxygen as the surfactant in an effective foam stabilizing amount.

31. The method of claim 30 wherein said group is carboxyl, carbonyl or oxygen.

32. The method of claim 30 wherein said polyolefin is selected from the group consisting of polyethylene and polypropylene.

33. The method of claim 1 wherein said molten thermoplastic comprises a hot melt polymer and a polymeric surfactant stabilizer.

34. The method of claim 33 wherein said polymer is selected from the group consisting of polymers of ethylenically unsaturated monomers, polymers of conjugated diene monomers, polyesters, polyamides, polyesteramides and polyurethanes, and copolymers of said monomers.

35. The method of claim 34 wherein said surfactant is an ionic polymer.

* * * * *